US011875624B2

(12) United States Patent
Studerus

(10) Patent No.: US 11,875,624 B2
(45) Date of Patent: Jan. 16, 2024

(54) SECURITY CONTROL MODULE AND SYSTEM

(71) Applicant: Dormakaba Schweiz AG, Rümlang (CH)

(72) Inventor: Paul Studerus, Oberweningen (CH)

(73) Assignee: Dormakaba Schweiz AG, Rümlang (CH)

( * ) Notice: Subject to any disclaimer, the term of this patent is extended or adjusted under 35 U.S.C. 154(b) by 0 days.

(21) Appl. No.: 17/997,114

(22) PCT Filed: Apr. 22, 2021

(86) PCT No.: PCT/EP2021/060593

§ 371 (c)(1),
(2) Date: Oct. 25, 2022

(87) PCT Pub. No.: WO2021/219492

PCT Pub. Date: Nov. 4, 2021

(65) Prior Publication Data

US 2023/0169811 A1 Jun. 1, 2023

(30) Foreign Application Priority Data

Apr. 29, 2020 (CH) .................................... 00501/20

(51) Int. Cl.
*G07C 9/10* (2020.01)
*G07C 9/28* (2020.01)

(52) U.S. Cl.
CPC *G07C 9/10* (2020.01); *G07C 9/28* (2020.01)

(58) Field of Classification Search
CPC .................................... G07C 9/10; G07C 9/28
(Continued)

(56) References Cited

U.S. PATENT DOCUMENTS

2004/0002346 A1 1/2004 Santhoff
2016/0343183 A1* 11/2016 Dumas ............... G07C 9/00309
(Continued)

FOREIGN PATENT DOCUMENTS

WO WO 2018/048956 A1 3/2018
WO WO 2018/227118 A1 12/2018

OTHER PUBLICATIONS

International Search Report and Written Opinion of the International Searching Authority for International Application No. PCT/EP2021/060593, dated Jul. 16, 2021, in 16 pages.

*Primary Examiner* — Daniel A Hess
(74) *Attorney, Agent, or Firm* — Knobbe, Martens, Olson & Bear, LLP

(57) ABSTRACT

A security control module for controlling access through a passageway of a secure control area, comprising an ultra-wideband transceiver configured to establish an ultra-wideband transmission with a mobile device and a processing unit configured to determine a first distance between the security control module and the mobile device by processing signal properties of the ultra-wideband transmission. The security control module is configured to receive a second distance from a further security control module arranged at a spacing distance apart, the second distance being indicative of a distance between the further security control module and the mobile device. The processing unit is configured to determine the relative position of the mobile device with respect to the security control module based on the first and second distance.

17 Claims, 13 Drawing Sheets

(58) Field of Classification Search
USPC .......................................................... 235/93
See application file for complete search history.

(56) References Cited

U.S. PATENT DOCUMENTS

| | | | |
|---|---|---|---|
| 2017/0148243 | A1 | 5/2017 | Shin et al. |
| 2018/0081025 | A1 | 3/2018 | Jonsson et al. |
| 2021/0112064 | A1 * | 4/2021 | Losseva ................ H04L 63/102 |

* cited by examiner

SECURITY CONTROL MODULE AND SYSTEM

CROSS-REFERENCE TO RELATED APPLICATIONS

This application is the U.S. National Phase under 35 U.S.C. § 371 of International Application PCT/EP2021/060593, filed Apr. 22, 2021, which claims priority to CH Application No. 00501/20, filed Apr. 29, 2020, the entire contents of each of which are incorporated by reference herein and made a part of this specification.

PRIORITY CLAIM

The present application claims the priority of Swiss Patent Application CH 00501/20.

FIELD OF THE INVENTION

The present invention relates to a security control module, a security control system and methods for operating thereof. Specifically, the present invention relates to a security control module, comprising an ultra-wideband transceiver and a processing unit. Furthermore, the present invention relates to a computer program product comprising computer-executable instructions which, when executed by a processing unit of a security control module or a security control system, causes the security control module respectively system to carry out the method for access control. The present invention relates to a security control system comprising a plurality of security control modules and a mobile device configured to establish a transmission with the security control modules.

BACKGROUND OF THE INVENTION

Keyless entry systems have become widely used in applications ranging from vehicle entry systems and vehicle access control systems to building access control. For close-range applications, a radio-frequency identification (RFID) transponder (or tag) is often used, which has mostly replaced earlier magnetic stripe cards. Other current solutions use infra-red systems or radio systems to transmit an authenticating signal from a user device to a vehicle security system or to a building access device. The authentication can be initiated either by the user, for instance by pressing a button on the user device, or from the access device itself which periodically transmits request signals and awaits a response message.

As the communicating range between a user device and an access device increases, the convenience and ease-of-use increases, because the user device does not need to be placed in very close range, such as less than one centimeter. However, as the range increases, potential new security issues also arise. In certain entry systems it is very important that the system can determine not only the proximity of a user but also its relative location with respect to an entry/exit direction. Several use cases exist where an entry system is configured/configurable as a one-way system, wherein a user is granted access/passage only from an entry side towards and exit side of a controlled gate while access/passage is denied and/or restricted in the opposite direction, i.e. from the exit side towards the entry side. For example, boarding/check-in and passport control gates need to be configured such that access/passage is granted only in a predefined direction and is denied/restricted in the opposite direction.

Close-proximity keyless systems, (i.e. between direct contact and a threshold of 1-2 centimeters), for example RFID based systems, allow determination of a user's position with respect to an entry respectively exit side of a gate by appropriate placement of a reader device on the respective side of the gate. However, as their name implies close-proximity keyless systems suffer from the disadvantage that they require a very close proximity to the reader. This is disadvantageous since users are required to identify the location of the reader device which might be time consuming and often requires multiple user attempts.

In order to overcome the above disadvantages, mid-range keyless entry systems have been proposed, in particular based on ultra-wideband UWB communication. Ultra-wideband UWB systems are advantageous since they allow reliable mid-range communication without a user having to precisely identify the reader device. Also, Ultra-wideband UWB systems are advantageous since they allow precise measurement of a distance between a reader device and a mobile device.

However, presently known mid-range keyless entry systems only allow determination of an absolute distance of a user's mobile device, not his relative location with respect to a second section (entry side) respectively a first section (exit side) of an access controlled area (e.g. by means of an access gate). This poses a security risk in certain use cases, in particular security control systems, requiring a one-way entry system, since entry/passage may be inadvertently granted to a user in the opposite direction. Also, entry/passage may be inadvertently granted to an unauthorized user situated at a second section (entry side of a gate), closely following an authorized user situated on the first section (exit side of the same gate) of the access controlled area.

SUMMARY OF THE INVENTION

It is an object of this invention to provide a security control module, a security control system and a method for operating a security control module within a secure control area that overcomes one or more of the disadvantages of known security control modules, security control systems and of known methods for access control of security control modules/systems, in particular the security risks associated with one-way security control modules/systems.

In particular, it is an object of the present invention to provide a security control module and a corresponding method for operating a security control module, ensuring that the relative location of a user carrying a mobile device is determined with respect to the security control module.

According to the present invention, the above-mentioned objects are addressed through the features of the independent claims. In addition, further advantageous embodiments follow from the dependent claims and the description.

According to the present invention, the above-mentioned objects are particularly addressed by a security control module for controlling access through a passageway of a secure control area, the security control module comprising: an ultra-wideband transceiver configured to establish an ultra-wideband transmission with an ultra-wideband communication module of a mobile device and a processing unit configured to determine a first distance between the security control module and the mobile device by processing signal properties of the ultra-wideband transmission. Ultra-wide-band is a communications technology which uses radio waves for short-range, high-bandwidth communications over a large portion of the radio spectrum. Information is transmitted by generating radio wave pulses at specific time intervals, as opposed to conventional radio systems which transmit information by varying a power level of the radio transmission, or modulating a frequency and/or phase of the transmission. Information can also be modulated on ultra-wideband signals by varying an amplitude, encoding a polarity, or using orthogonal pulses.

The security control module is configured to receive a second distance from a further security control module arranged at a spacing distance apart from the security control module, the second distance being indicative of a distance between the further security control module and the mobile device. The security control module is further configured to transmit the first distance to the further security control module. As such, the security control module and the further security control module are set up to collaboratively exchange the first distance D1 and second distance D2. The processing unit of the security control module is configured to determine the relative position of the mobile device with respect to the security control module based on the first distance and the second distance.

Determining the distance between the security control modules and the mobile device by processing signal properties of ultra-wideband UWB transmissions is particularly advantageous since it allows a reliable and precise determination of the distances.

The security control module is envisaged to be an integral part of or an add-on to any installation that defines a passageway between sections of a secure control area for the passage of persons. According to further embodiments, the security control system is arranged within the secure control area such as to define a passageway between the first section and the second section of the plurality of sections of the secure control area.

According to embodiment(s) disclosed herein, the security control module is configured to transmit the first distance to the further security control module and to receive the second distance from the further security control module via an ultra-wideband transmission between the ultra-wideband transceiver and an ultra-wideband transceiver of the further security control module.

According to embodiment(s) disclosed herein the security control module is further configured to deny, disregard and/or block authentication requests from the mobile device if the mobile device has been determined to be positioned at distance greater than a threshold distance from the security control module.

According to embodiment(s) disclosed herein, the ultra-wideband transceiver is configured to determine the first distance by processing signal properties of the ultra-wideband transmission including one or more of: a propagation time; an amplitude variation; and/or a phase difference.

Determining a distance based on the propagation time of an ultra-wideband transmission comprises measuring the time required for a signal to travel from the ultra-wideband transceiver to the ultra-wideband communication module of the mobile device; and/or the time required for a signal to travel from the mobile device to the ultra-wideband transceiver. In a particular embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband transceiver sending the request value and the mobile device receiving the request value, or a "round-trip time-of-flight" time difference, in which a second transmission takes place from the mobile device to the ultra-wideband transceiver either prior to, or after, the first transmission of the request value. In the "one-way time-of-flight" scenario, the ultra-wide-band transceiver and the mobile device need to be provided with tightly synchronized clocks for accurately determining the distance. In the latter case of a "round-trip time-of-flight" calculation, there is stored, either in the mobile device or the ultra-wideband transceiver, an accurate representation of the processing time, i.e. the time it takes between the reception of an ultra-wideband transmission and the sending of a response ultra-wideband transmission, which processing time allows for accurately determining the distance. Measurement of a time required for the signal to travel from the ultra-wideband transceiver to the mobile device and back "round-trip time-of-flight" is advantageous as it does not require the precise synchronization of clock signals of the ultra-wideband transceiver and the mobile device.

Determining a distance based on amplitude difference, comprises determining the difference in signal amplitude between the signal transmitted by the ultra-wideband transceiver and the signal received by the mobile device (or vice-versa). By taking into consideration the attenuation of the signal, the distance between the ultra-wideband transceiver and the mobile device is calculated.

Determining a distance based on phase difference comprises detecting the difference in signal phase between the signal transmitted by the ultra-wideband transceiver and the signal received by the mobile device. By taking into consideration the change in signal phase, the distance between the ultra-wideband transceiver and the mobile device is determined. It is to be understood that for the amplitude difference and phase difference, alternatively, the signal may also be transmitted by the mobile device and received by the ultra-wideband transceiver.

The above-identified objectives are further addressed by a security control system for controlling access through a passageway of a secure control area comprising a plurality of security control modules. A security control module and a further security control module of the plurality of security control modules is located in a first section and a second section of the secure control area, respectively, the passageway connecting said first section and said second section. The processing units of the security control module and/or the further security control module are configured to determine the relative position of the mobile device further with respect to the first section and said second section of the secure control area.

The modular security control system of the present invention is particularly advantageous since it is easily deployable and extendible by additional security control module(s). The security control modules build a sort of mesh network, wherein each module performs its distance measurements by itself. After the modules exchange distance data, each module can independently determine whether it is responsible for further interaction (e.g. access control) with the mobile device, a particular module being responsible e.g. if it is the nearest or at least in the same section as the mobile device.

According to embodiments disclosed herein, the relative position (of the mobile device with respect to a first section respectively a second section of the plurality of sections of the secure control area) comprises an indication whether the mobile device is located in the first section or the second section of secure control area. Additionally, or alternatively, the relative position (of the mobile device with respect to a first section respectively a second section of the plurality of sections of the secure control area) comprises an indication whether the corresponding security control module is the closest to the mobile device (of the plurality of security control modules which exchanged distance data).

According to embodiment(s) disclosed herein, the spacing distance between any pair of the plurality of security control modules of the security control system is greater than or equal to the sum of the measurement precision of the ultra-wideband transceivers of said plurality of security control modules.

While the measurement precision using ultra-wideband technology is on the order of few centimetres, the spacing distance between the ultra-wideband transceiver and the second ultra-wideband may be up to a meter or more.

According to embodiment(s) disclosed herein, the ultra-wideband transceivers of the security control module and the further security control module of the plurality of security control modules are aligned essentially orthogonal to a border delimiting the first section from the second section of the secure control area. The processing units of the security control module and/or the further security control module are configured to determine the relative position of the mobile device further based on location data comprising transceiver distances indicative of distances of the ultra-wideband transceivers from said border. Aligning the ultra-wideband transceiver and the ultra-wideband transceiver of the further security control module essentially orthogonal to a border delimiting the first section from the second section of the secure control area allows determination of the position of the mobile device with respect to the first section or second section by triangulation, using only two ultra-wideband transceivers, as it will be described with reference to FIGS. 2B, 3B and 4B.

According to embodiment(s) disclosed herein, the security control module and/or the further security control module of the plurality of security control modules are further configured to execute an access control process for the mobile device if the mobile device has been determined to be positioned in said first section or said second section of the secure control area, respectively.

According to embodiment(s) disclosed herein, a third security control module of the plurality of security control modules of the security control system is arranged in the proximity of a further passageway connecting said first section and said second section adjacent to the passageway. At least one of the processing units of the plurality of security control modules is configured to determine the relative position of the mobile device further with respect to each of the plurality of passageways, based on the first distance determined by the respective security control module and a plurality of distances received from the plurality of security control modules.

The above-identified objectives are further addressed by a computer implemented method for operating a security control module according to one of the embodiments disclosed herein, the method comprising: establishing an ultra-wideband transmission between an ultra-wideband transceiver of the security control module and an ultra-wideband communication module of a mobile device; determining—by a processing unit of the security control module—a first distance between the security control module and the mobile device by processing signal properties of the ultra-wideband transmission;

receiving a second distance from a further security control module arranged at a spacing distance apart from the security control module, the second distance being indicative of a distance between the further security control module and the mobile device; transmitting the first distance from the security control module to the further security control module; and determining—by the processing unit of the security control module—the relative position of the mobile device with respect to the security control module based on the first distance and the second distance.

According to embodiment(s) disclosed herein, the computer implemented method for operating a security control module further comprises the step of denying, disregarding and/or blocking authentication requests from the mobile device if the mobile device has been determined to be positioned at distance greater than a threshold distance from the security control module/system.

According to embodiment(s) disclosed herein, determining the first distance between the ultra-wideband transceiver and the mobile device comprises transmitting a request message to the ultra-wideband communication module of the mobile device and processing a response message received from the mobile device, referred to as gate initiated transmission. Gate initiated transmission is advantageous as the timing respectively the frequency of the interrogation (transmitting a request message to the mobile device) is solely in the control of the security control system.

Alternatively, or additionally, determining the first distance between the ultra-wideband transceiver and a mobile device comprises receiving and processing a broadcast signal from the mobile device, referred to as mobile device initiated transmission. Mobile device initiated transmission is advantageous since it allows the mobile device to control the timing/frequency of the broadcast signal(s) (to establish the first respectively second ultra-wideband transmission), allowing the mobile device to switch its respective radio communication module into a standby/low-power or off mode to thereby conserve energy.

The above-identified objectives are further addressed by a computer implemented method for operating a security control system according to one of the embodiments disclosed herein, the method comprising: establishing an ultra-wideband transmission between each ultra-wideband transceiver of the plurality of security control modules and an ultra-wideband communication module of a mobile device; determining—by the processing units of each security control module—a first distance between the security control modules and the mobile device by processing signal properties of the ultra-wideband transmissions; at least one security control module transmitting the first distance to the further security control modules; at least one security control module receiving a second distance from a further security control module arranged at a spacing distance apart, the second distance being indicative of a distance between the further security control modules and the mobile device; and determining—by at least one processing unit(s) of the security control module(s)—the relative position of the mobile device with respect to the security control modules and relative to the first section and said second section of the secure control area based on the first distance and the second distance.

According to embodiment(s) disclosed herein, the computer implemented method for operating a security control system further comprises the step of executing an access control process for the mobile device by the security control module and/or the further security control module of the plurality of security control modules if the mobile device has been determined to be positioned in said first section or said second section of the secure control area, respectively.

According to embodiment(s) disclosed herein, executing access control for the mobile device comprises: requesting authentication data from the mobile device; receiving authentication data from the mobile device; verifying said authentication data from the mobile device in order to determine whether the mobile device is authorized; and granting access for the mobile device if the mobile device is authorized, particularly comprising one or more of: opening a section separation panel(s); unlocking a door and/or allowing passage of a turnstile operatively connected to the security control system.

Authentication data, as used herein, comprises—but is not limited to—a user ID, a user name, a government- or institution-issued identification number and/or identity verification data such as a secure ID, a personal identification number PIN, an access key, and/or a password. According to embodiments disclosed herein, the authentication data is transmitted by the mobile device to the security control system in an encrypted format to prevent unauthorized access (eavesdropping) of said authentication data. In a subsequent step, the security control system receives authentication data from the mobile device. Alternatively, or additionally, the authentication data is confirmed by biometric data, such as a fingerprint, retinal scan and/or voice pattern.

According to embodiments disclosed herein, the authentication data is transmitted from the mobile device to the security control system in the same ultra-wideband frequency as the messages used for determining its distance and received by the ultra-wideband transceiver or ultra-wideband transceiver of the further security control module. Alternatively, or additionally the authentication data is transmitted from the mobile device to the security control system using a wireless communication module of the mobile device and a corresponding wireless communication module of the security control system, using an alternative communication technology (as compared to UWB) such as a Bluetooth (BT), Bluetooth Low Energy (BLE), a Wireless Local Area Network (WLAN), Zig Bee, Radio Frequency Identification (RFID), Z-Wave, and/or Near Field Communication (NFC).

Further disclosed herein is a computer program product comprising computer-executable instructions which, when executed by a processing unit of a security control module, causes the security control module to carry out the computer implemented method for operating a security control module according to one of the embodiments disclosed herein.

Further disclosed herein is a computer program product comprising computer-executable instructions which, when executed by a processing unit of a plurality of security control modules of a security control system, causes the security control system to carry out the computer implemented method for operating a security control system according to one of the embodiments disclosed herein.

BRIEF DESCRIPTION OF THE DRAWINGS

The present invention will be explained in more detail, by way of example, with reference to the drawings in which.

DETAILED DESCRIPTION OF EMBODIMENTS

Figure 1:
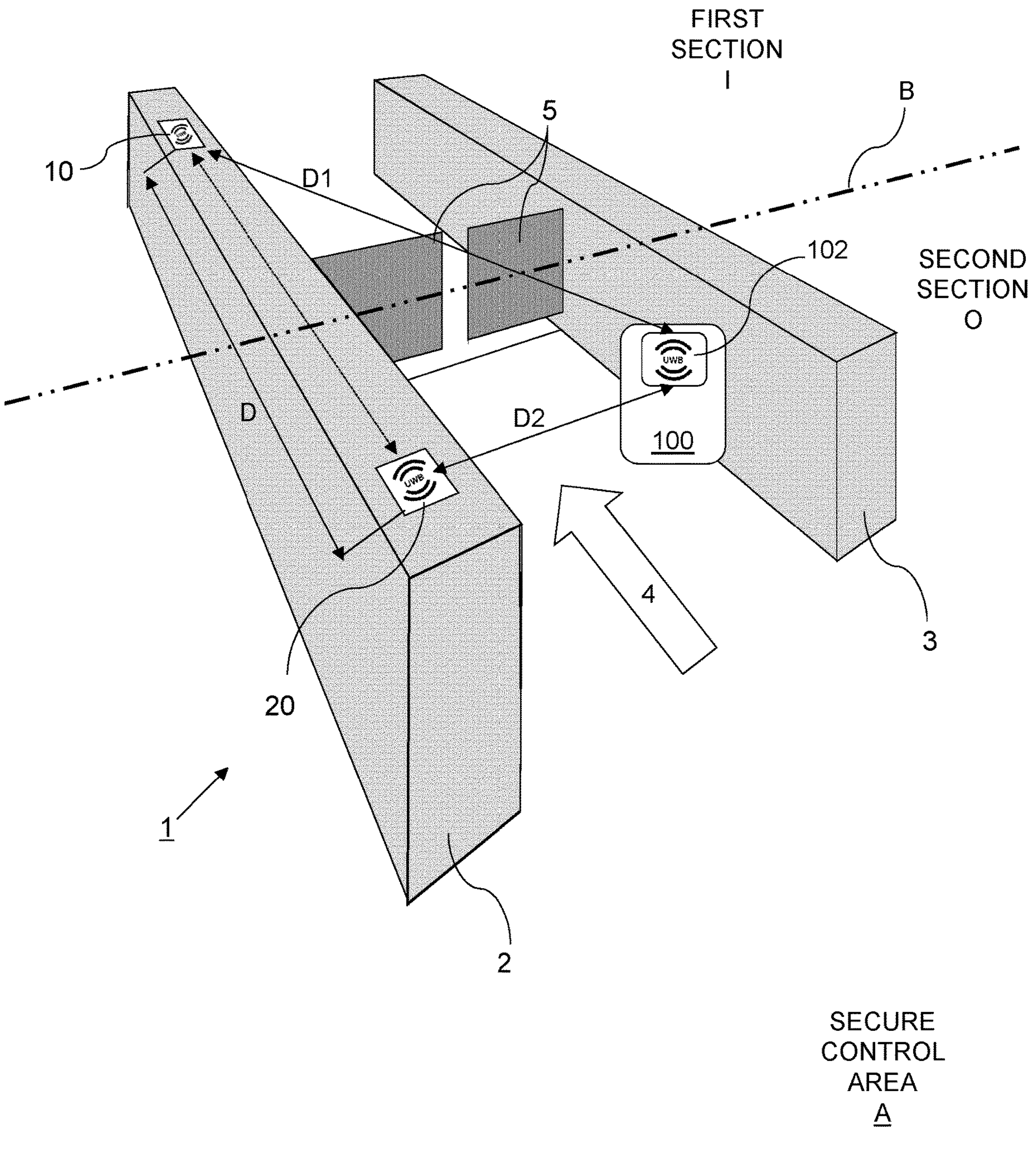
FIG. 1: shows a highly schematic perspective view of a first embodiment of the security control system according to the present invention.

FIG. 1 depicts a security control system 1 according to the present invention as arranged in a secure control area A. The secure control area A has a first section I and a second section O delimited by a border B (shown with dotted-dashed lines on the Figures). According to a particular embodiment disclosed herein, the first section I is a so-called inside or secure section while the second section O is a so-called outside section or non-secure section. Such embodiment corresponds to a use case where the security control system 1 is installed for example at an airport, wherein the first section I of the secure control area A corresponds to an area of the airport reserved for passengers with a valid boarding card, while the second section O is open to any person. Alternatively, or additionally the secure control area A may comprise a further section reserved for passengers possessing a valid passport, in particular a passport issued by a defined group of countries.

As illustrated in the highly schematic perspective view of FIG. 1, a first embodiment of the security control system 1 according to the present disclosure comprises a first sidewall 2 and second sidewall 3 defining a passageway 4 for persons to pass. The security control system 1 is arranged within the secure control area A such as to define a passageway 4 between the first section I and the second section O of the plurality of sections I, O of the secure control area A.

Depending on the specific safety provisions, the first sidewall 2 and second sidewall 3 are waist, shoulder or even floor-to-ceiling high and provide appropriate structural stability/strength to contain a person(s). The passageway 4 is actually not necessarily a structural element of the security control system 1, rather a gap defined by the first sidewall 2 and second sidewall 3 of the security control system 1. Alternatively, the passageway 4 may comprise a floor and/or ceiling portion(s) (not shown) linking the first sidewall 2 and second sidewall 3.

According to further embodiments, the security control system 1 is provided as an add-on to existing access control systems (e.g. gates, doors) comprising their own sidewalls and/or section separation panels, the security control system 1 being configured to control section separation panel(s) 5 of existing access control system.

As will be described in more detail in the following paragraphs, the security control system 1 according to the present disclosure comprises means for surveillance of presence around the security control system 1, in particular within said passageway 4. According to further embodiments disclosed herein, the security control system 1 further comprises means for controlling passage of persons through said passageway 4. In an embodiment shown in FIG. 1, the means for controlling passage of persons through said passageway 4 comprises a section separation panel(s) 5. Alternatively, or additionally, the means for controlling passage of persons through said passageway 4 comprises a door, turnstile or other suitable means for preventing passage of a person through a passageway.

Means for surveillance of presence around the security control system—in particular within said passageway 4—comprise a security control module 10 and a further security control module 20. As shown in FIG. 1, the security control module 10 and further security control module 20 are arranged a spacing distance D apart, the spacing distance D being greater than or equal to their measurement precision. According to further embodiments disclosed herein, the spacing distance D is greater than or equal to the sum of a first measurement precision of the security control module 10 and a second measurement precision of the further security control module 20. According to a particular embodiment of the security control system 1, the security control module 10 and further security control module 20 are arranged at opposite ends of the first sidewall 2 or second sidewall 3, the security control module 10 being arranged within the first section I while the further security control module 20 being arranged in the second section O of the secure control area A. Furthermore, as illustrated in FIGS. 1 to 3, the security control module 10 and the further security control module 20 are aligned essentially orthogonal to a border B delimiting the first section I from the second section O of the secure control area A.

In FIGS. 1 to 3, reference numeral 100 refers to a mobile device. The mobile device 100 is a portable electronic system such as a smart phone, smart watch, tablet, laptop, or similar device. The mobile device 100 contains a processor (not shown) and an ultra-wideband communication module 102. The ultra-wideband communication module 102 is configured for establishing an ultra-wideband transmission with a security control module 10 or further security control module 20 of the security control system 1. According to further embodiments disclosed herein, the mobile device 100 further comprises a wireless communication module for data transmission using an alternative communication technology (as compared to UWB) such as Bluetooth Low Energy (BLE), a Wireless Local Area Network (WLAN), Zig Bee, Radio Frequency Identification (RFID), Z-Wave, and/or Near Field Communication (NFC). According to further embodiments disclosed herein, the mobile device 100 also contains provisions for wired communication via a socket such as USB, Micro-USB, USB-C, Lightning, or 3.5 mm jack, for use in a wired communication using an appropriate protocol for wired transmission.

Figure 2A:
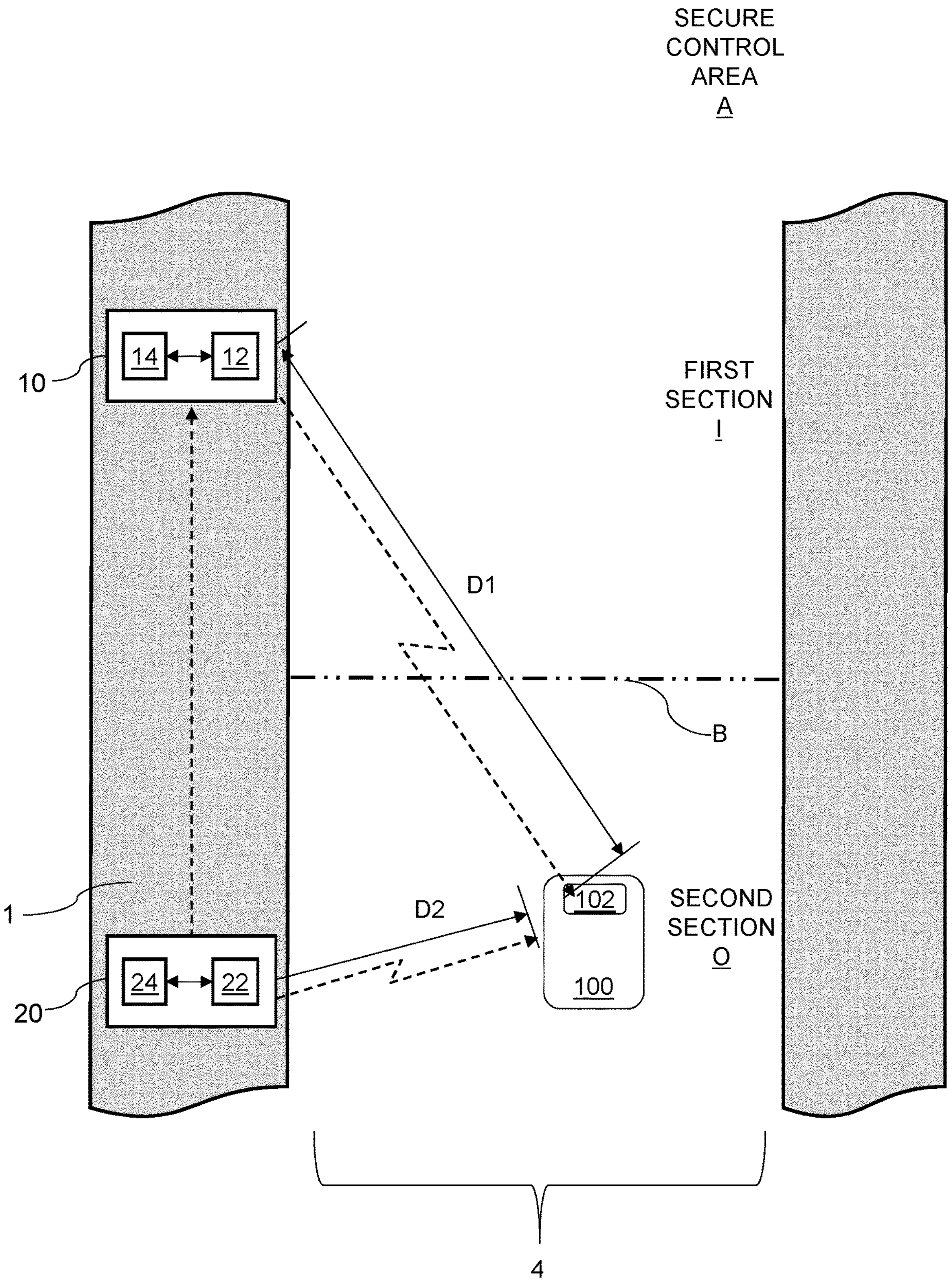
FIG. 2A, 2B: show highly schematic top views of a first embodiment of the security control system according to the present invention, illustrating determining the relative location of a mobile device situated in a second section of the secure control area.
Figure 2B:
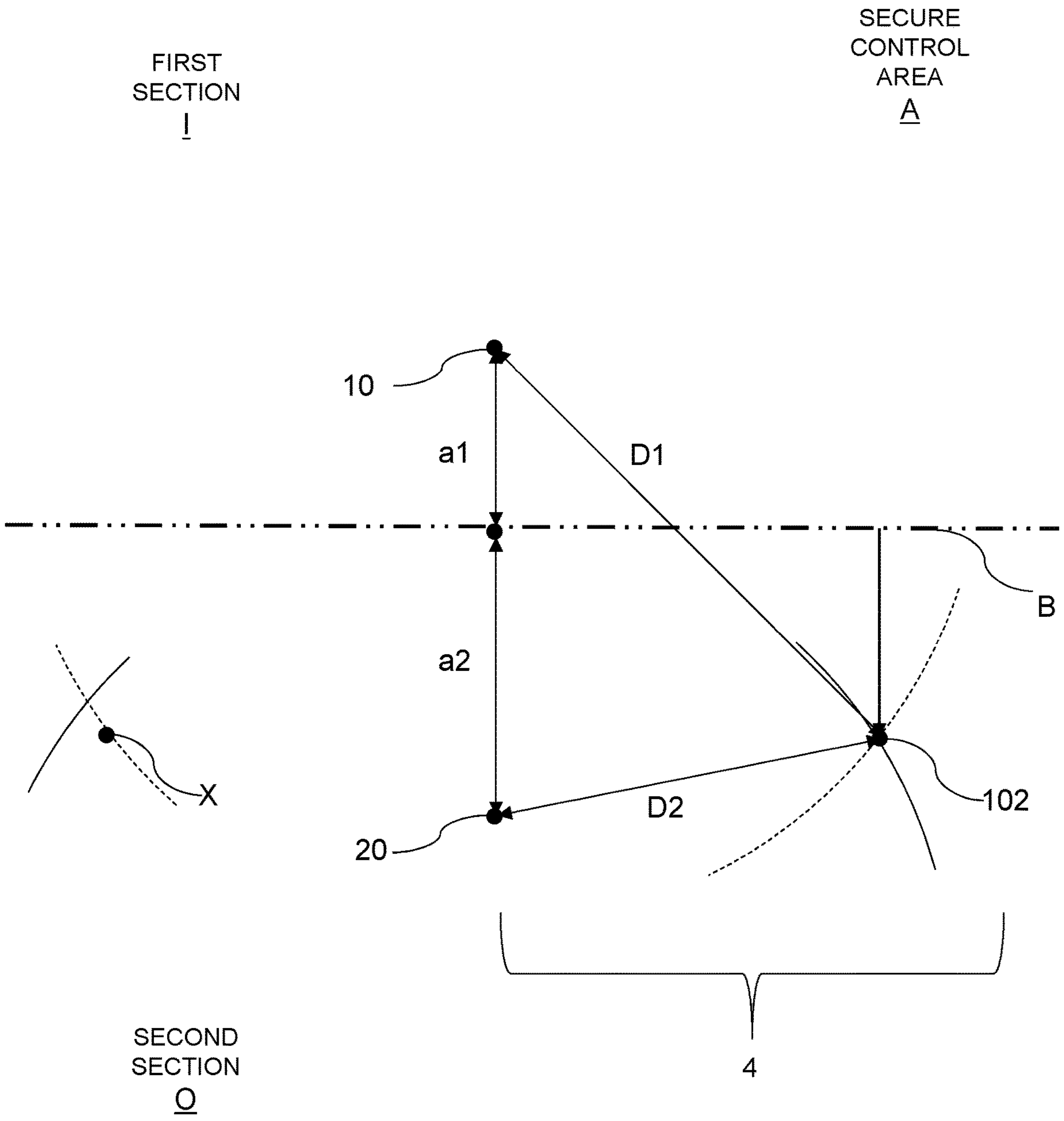

FIGS. 2A and 2B show highly schematic top views of a first embodiment of the security control system 1 according to the present disclosure comprising a pair of security control modules 10, 20, illustrating determining the relative location of a mobile device 100 situated in the second section O of the secure control area A. As shown on FIGS. 2A and 2B, each security control module 10, 20 comprises an ultra-wideband transceiver 12, 22 configured to establish an ultra-wideband transmission with an ultra-wideband communication module 102 of a mobile device 100. Furthermore, each security control module 10, 20 comprises a processing unit 14, 24 configured to determine a distance D1, D2 between the security control module 10, 20 and the mobile device 100 by processing signal properties of the ultra-wideband transmission.

As illustratively shown in FIG. 2A, the security control module 10 is configured to determine a first distance D1 between the security control module 10 and the mobile device 100. Analogously, the further security control module 20 is configured to determine a second distance D2 between the further security control module 20 and the mobile device 100.

As illustrated in FIG. 2B, the relative position of the mobile device 100 with respect to a first section I respectively a second section O of the plurality of sections I, O of the secure control area A is determined (by the processing units 14, 24) based on the first distance D1 and the second distance D2.

According to particular embodiments, the relative position of the mobile device 100 with respect to a first section I respectively a second section O is further determined based on location data indicative of the absolute position of the security control module 10, respectively the further security control module 20 with respect to said first section I and second section O, the location data comprising a first transceiver distance a1 indicative of a distance of the security control module 10 from said border B and a second transceiver distance a2 indicative of a distance of the further security control module 20 from said border B. As illustrated in FIG. 2B, the absolute location of the ultra-wideband communication module 102 can be determined to be at one of the two intersection points (shown with an 'X' and with the reference 102) of two circles having their centre at the security control module 10 and a radius equal to the first distance D1 (shown with a dotted-line arch) respectively having their centre at the security control module 10 and a radius equal to the second distance D2 (shown with a solid-line arch). Since the security control module 10 and the further security control module 20 are aligned essentially orthogonal to a border B delimiting the first section I from the second section O of the secure control area A, both intersection points (shown with an 'X' and with the reference 102) lay either in the first section I or the second section O of the secure control area A. Therefore, the relative position of the mobile device 100 with respect to the first section I respectively the second section O can be determined by the processing unit 14, 24 with absolute certainty.

Figure 3A:
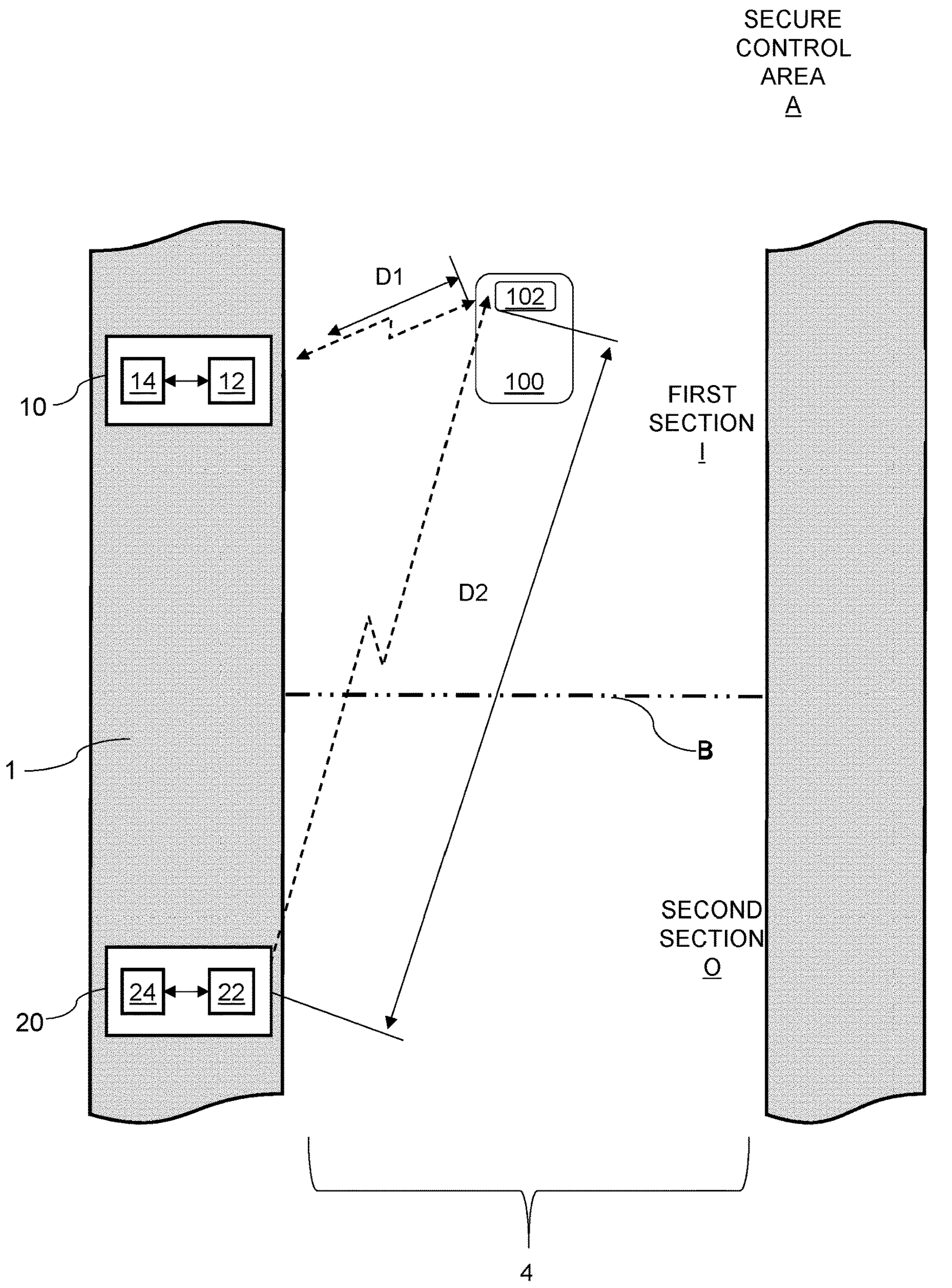
FIG. 3A, 3B: show highly schematic top views of a first embodiment of the security control system according to the present invention, illustrating determining the relative location of a mobile device situated in a first section of the secure control area.
Figure 3B:
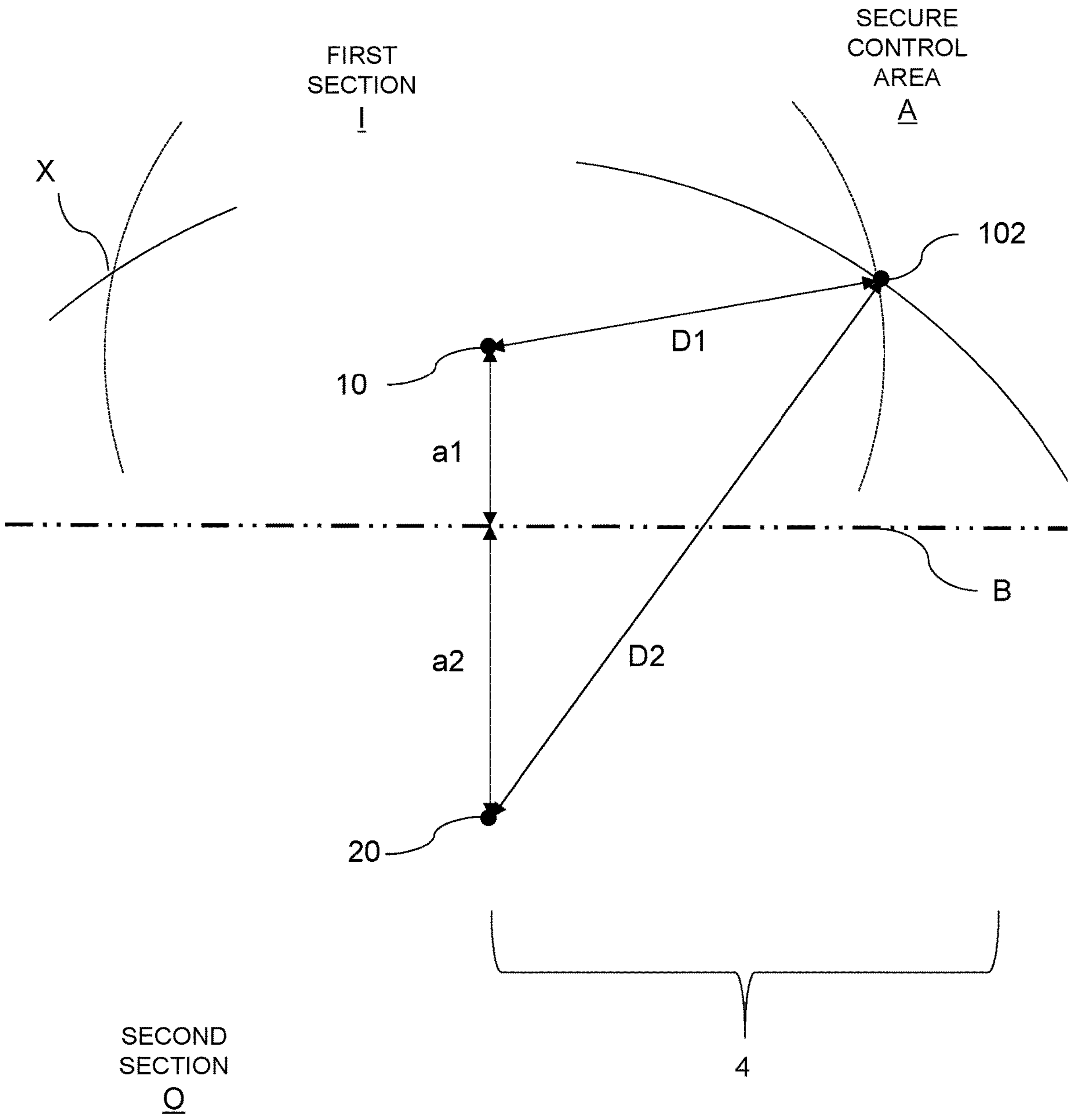

FIGS. 3A and 3B show highly schematic top views of a first embodiment of the security control system 1 according to the present disclosure, illustrating determining the relative location of a mobile device 100 situated in the first section I of the secure control area A. As illustratively shown in FIG. 3A, the security control module 10 is configured to determine a first distance D1 between the security control module 10 and the mobile device 100. Analogously, the further security control module 20 is configured to determine a second distance D2 between the further security control module 20 and the mobile device 100.

As illustrated in FIG. 3B, the relative position of the mobile device 100 with respect to a first section I respectively a second section O of the plurality of sections I, O of the secure control area A is determined (by the processing units 14, 24) based on the first distance D1 and the second distance D2.

According to particular embodiments, the relative position of the mobile device 100 with respect to a first section I respectively a second section O is further determined based on location data indicative of the absolute position of the security control module 10, respectively the further security control module 20 with respect to said first section I and second section O, the location data comprising a first transceiver distance a1 indicative of a distance of the security control module 10 from said border B and a second transceiver distance a2 indicative of a distance of the further security control module 20 from said border B. As illustrated in FIG. 3B, the absolute location of the ultra-wideband communication module 102 can be determined to be at one of the two intersection points (shown with an 'X' and with the reference 102) of two circles having their centre at the security control module 10 and a radius equal to the first distance D1 (shown with a dotted-line arch) respectively having their centre at the security control module 10 and a radius equal to the second distance D2 (shown with a solid-line arch). Since the security control module 10 and the further security control module 20 are aligned essentially orthogonal to a border B delimiting the first section I from the second section O of the secure control area A, both intersection points (shown with an 'X' and with the reference 102) lay either in the first section I or the second section O of the secure control area A. Therefore, the relative position of the mobile device 100 with respect to the first section I respectively the second section O can be determined by the processing units 14, 24 with absolute certainty. The term relative position of the mobile device 100 with respect to the first section I respectively the second section O as used herein comprises (but is not limited to) an indication whether the mobile device 100 is located in the first section I or the second section O of the secure control area A, for example as a logical value (true/false with respect to I and O).

Figure 4A:
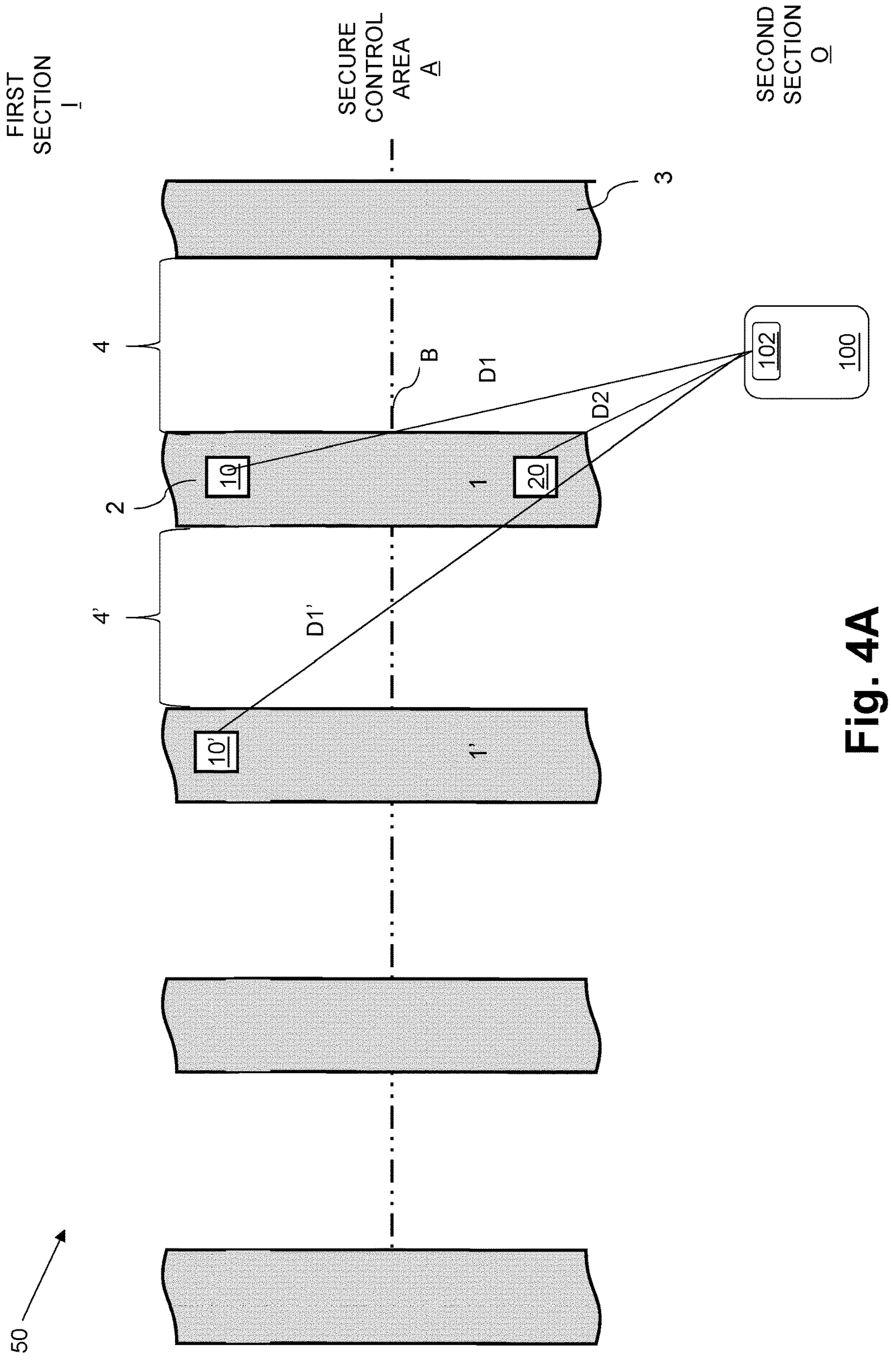
FIG. 4A, 4B: show highly schematic top views of a further security control system according to the present invention, comprising three security control modules arranged in a secure control area comprising a plurality of passageways.
Figure 4B:
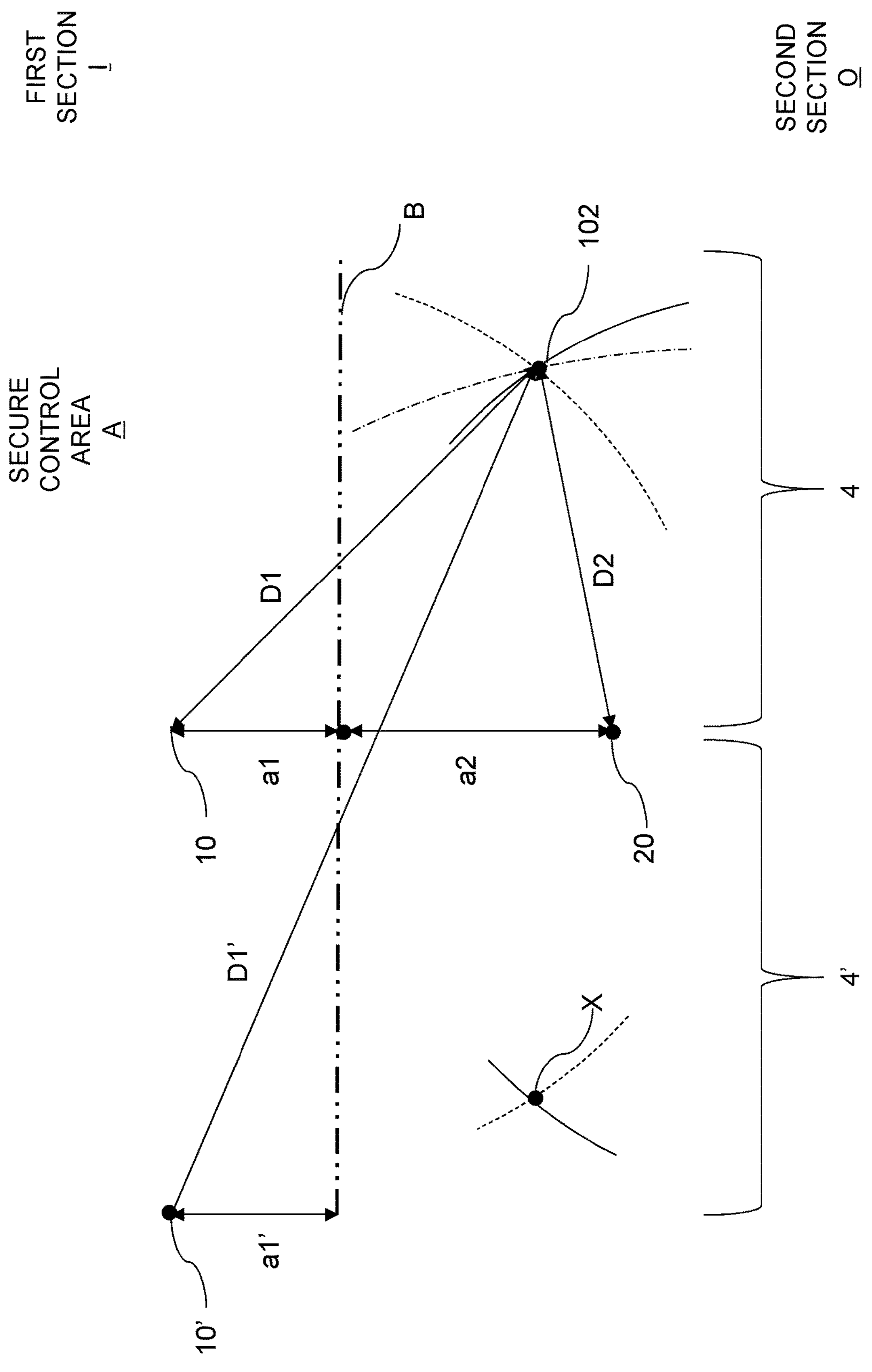

FIGS. 4A and 4B show highly schematic top views of a security control system 1 according to the present disclosure, wherein a third security control module 10' of the plurality of security control modules 10, 20, 10' is arranged in the proximity of a further passageway 4' connecting said first section I and said second section O adjacent to the passageway 4. As illustrated on FIG. 4A, respective pairs of adjacent passageways 4, 4' share a common further security control module 20.

As illustrated in FIG. 4B, in addition to the first distance D1 and the second distance D2, the relative position of the mobile device 100 with respect to a first section I, a second section O of the plurality of sections I, O and with respect to each of the plurality of passageways 4, 4' is determined by at least one of the processing units 14, 14' and 24 of the plurality of security control modules 10, 20, 10', based on the first distance D1 determined by the corresponding security control module 10 and a plurality of distances D2, D1' received from the other security control modules 20, 10'. In other words, the security control modules 10, 20, 10' collaboratively determine the relative position of the mobile device 100 by determining its distance from each security control module 10, 20, 10' and exchanging the distances D1, D2, D1' between each other.

According to further embodiments, the relative position of the mobile device 100 is determined further based on location data indicative of the absolute position of the security control module 10, the further security control module 20 as well as location data indicative of the absolute position of the adjacent security control module 10' with respect to said first section I, second section O, the passageway 4 and with respect to the adjacent passageway 4'.

In a particular embodiment of the present invention, the location data indicative of the absolute position of the adjacent security control module 10' comprises a first adjacent transceiver distance a1' indicative of a distance of the adjacent security control module 10' from said border B.

As illustrated in FIG. 4B, the absolute location of the ultra-wideband communication module 102 of the mobile device 100 can be determined to be the single intersection point (shown with the reference 102) of three circles:

- the first circle having its centre at the security control module 10 and a radius equal to the first distance D1 (shown with a dotted-line arch),
- the second circle having its centre at the further security control module 20 and a radius equal to the second distance D2 (shown with a solid-line arch), and
- the third circle having its centre at the adjacent security control module 10' of the adjacent passageway 4' and a radius equal to the first adjacent distance D1' (shown with a dotted-dashed-line arch)

In order to be able to not only determine the relative position of the mobile device 100 with respect to the first section I and O of the secure control area A, but also with respect to the plurality of passageways 4, 4', the processing unit(s) 14, 14', 24 needs to process the first adjacent distance D1' from the adjacent security control module 10' of the adjacent passageway 4' (third circle in FIG. 4B). The term relative position of the mobile device 100 with respect to the first section I, the second section O and the plurality of passageways 4, 4' as used herein comprises (but is not limited to) an indication whether the mobile device 100 is located in the first section I or the second section O of the secure control area A within a particular passageway 4, 4' for example as a logical value (true/false with respect to I and O and each passageway 4, 4').

Figure 5:
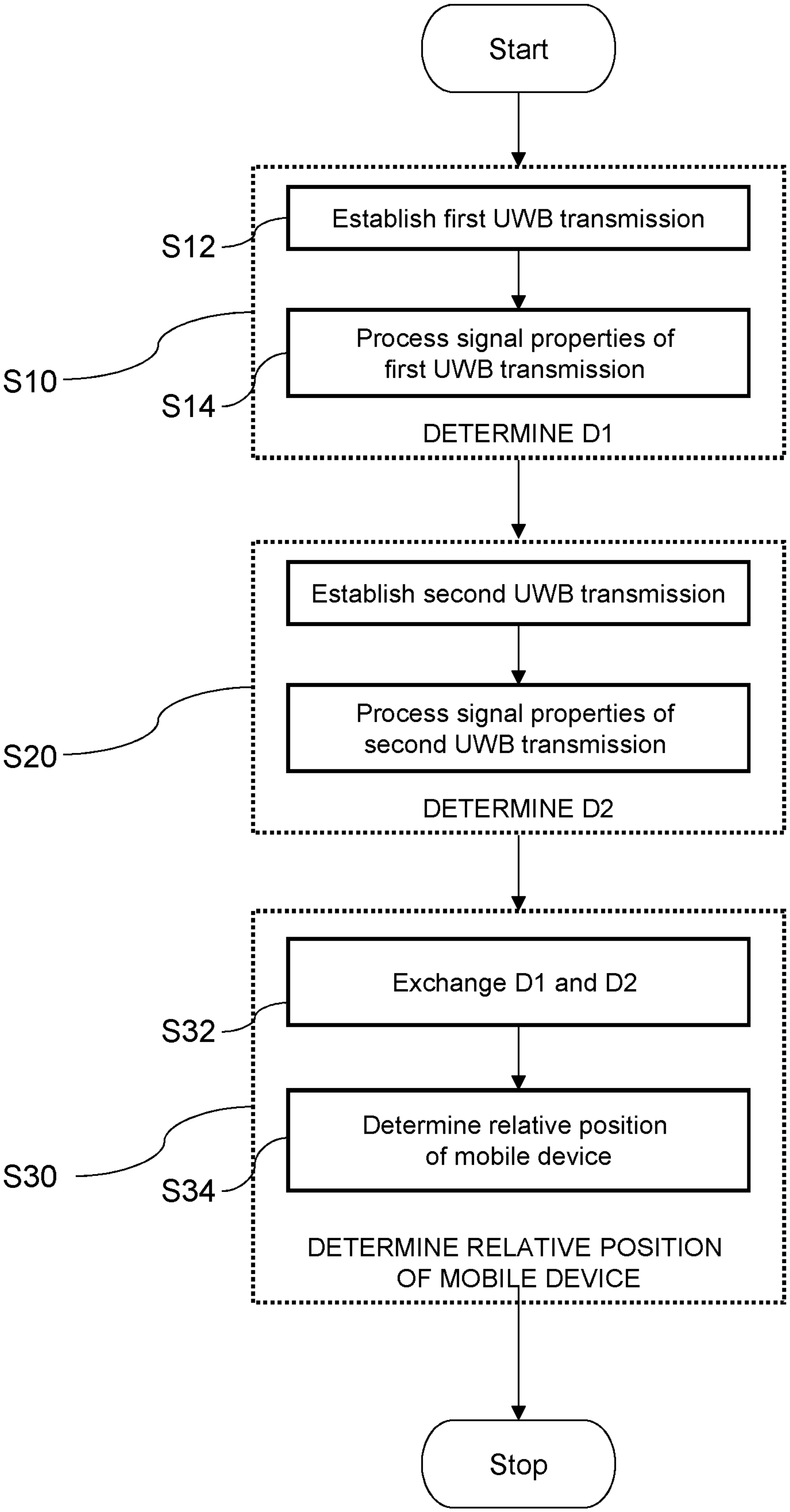
FIG. 5: shows a flow chart illustrating a sequence of steps for determining the relative position of the mobile device within the secure control area, according to embodiments of the present invention.
Figure 6A:
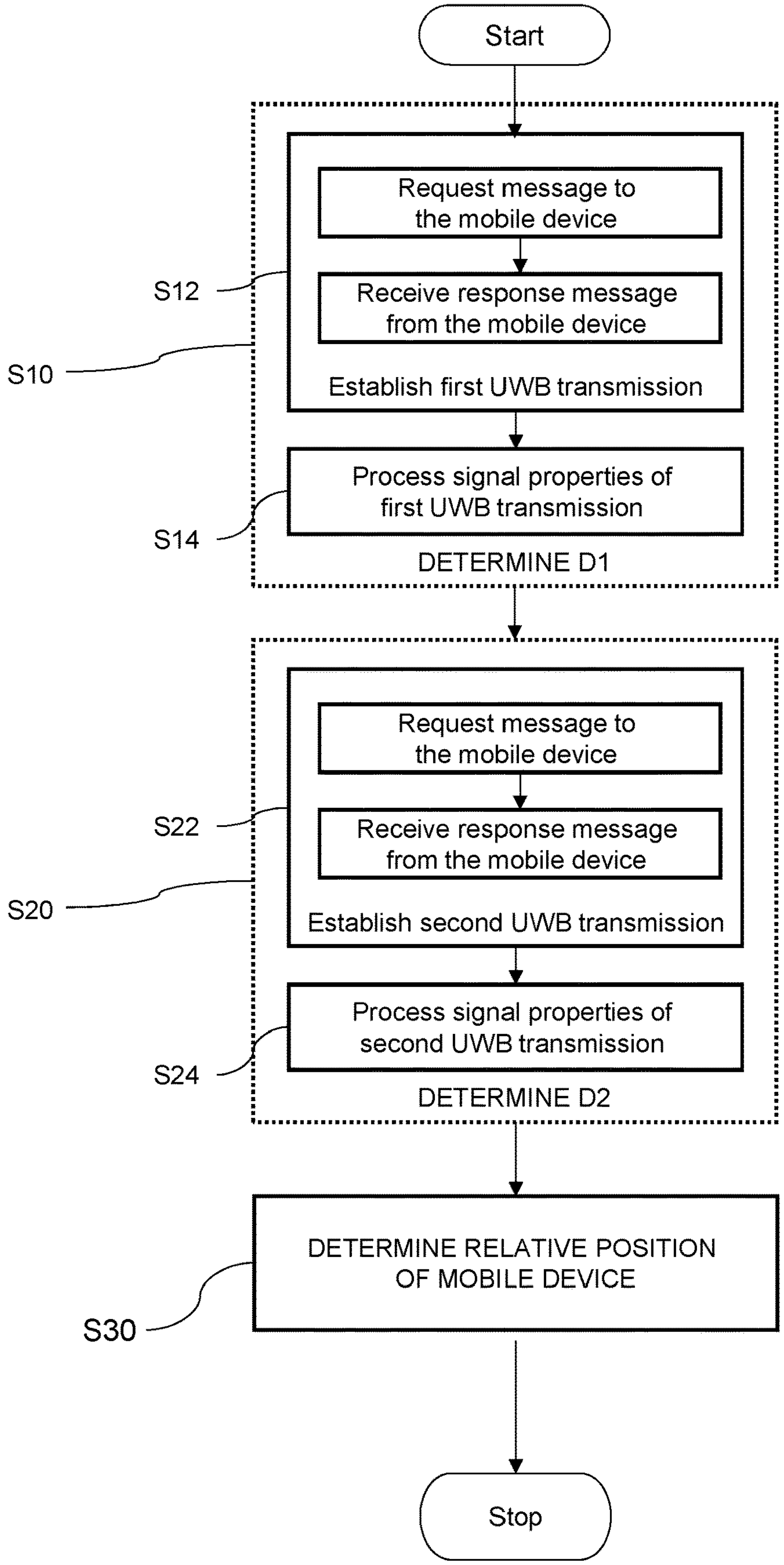
FIG. 6A: shows a flow chart illustrating a sequence of steps for establishing the UWB transmissions, according to a first embodiment of the present invention.
Figure 6B:
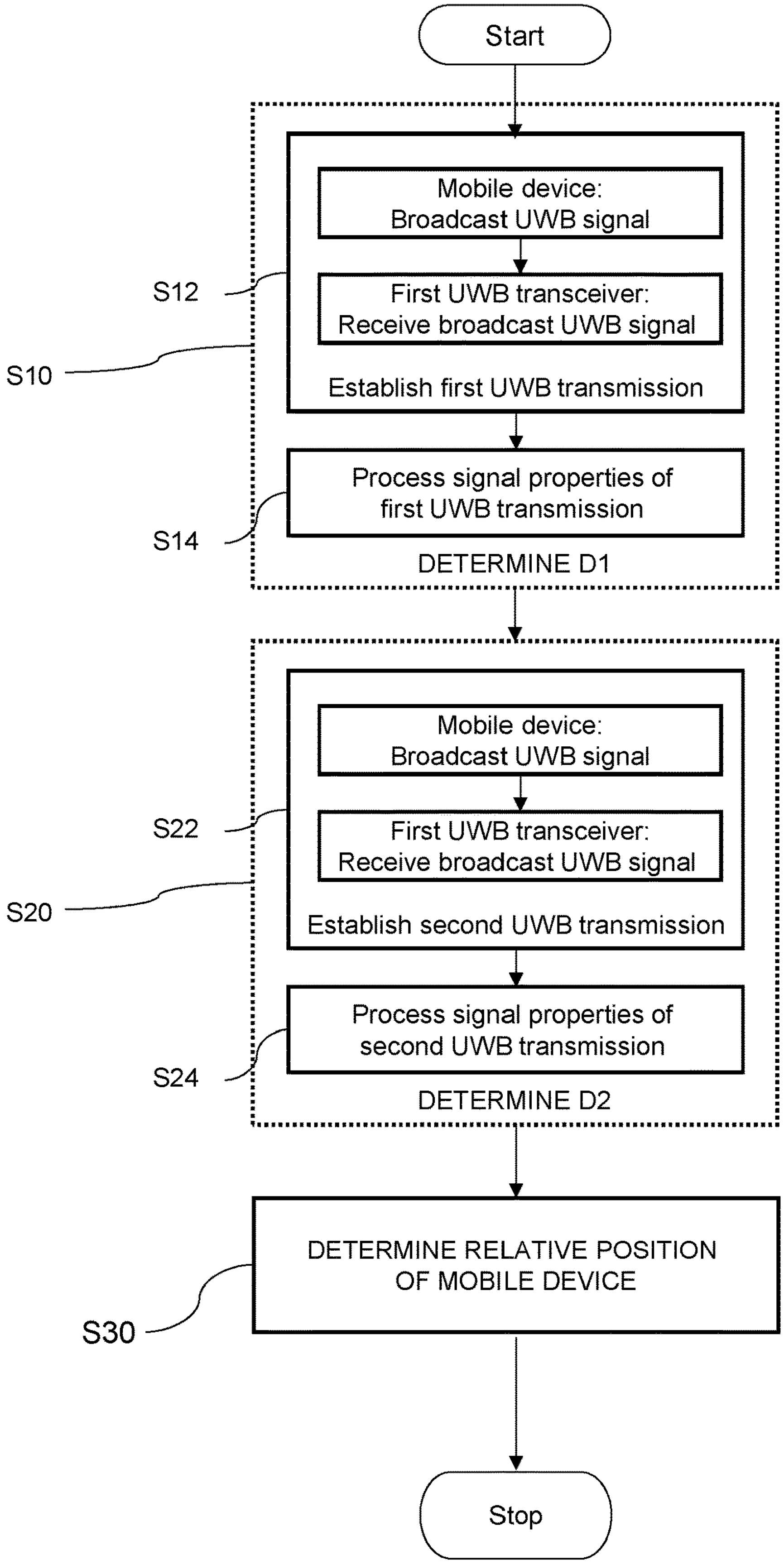
FIG. 6B: shows a flow chart illustrating a sequence of steps for establishing the UWB transmissions, according to a further embodiment of the present invention.
Figure 7:
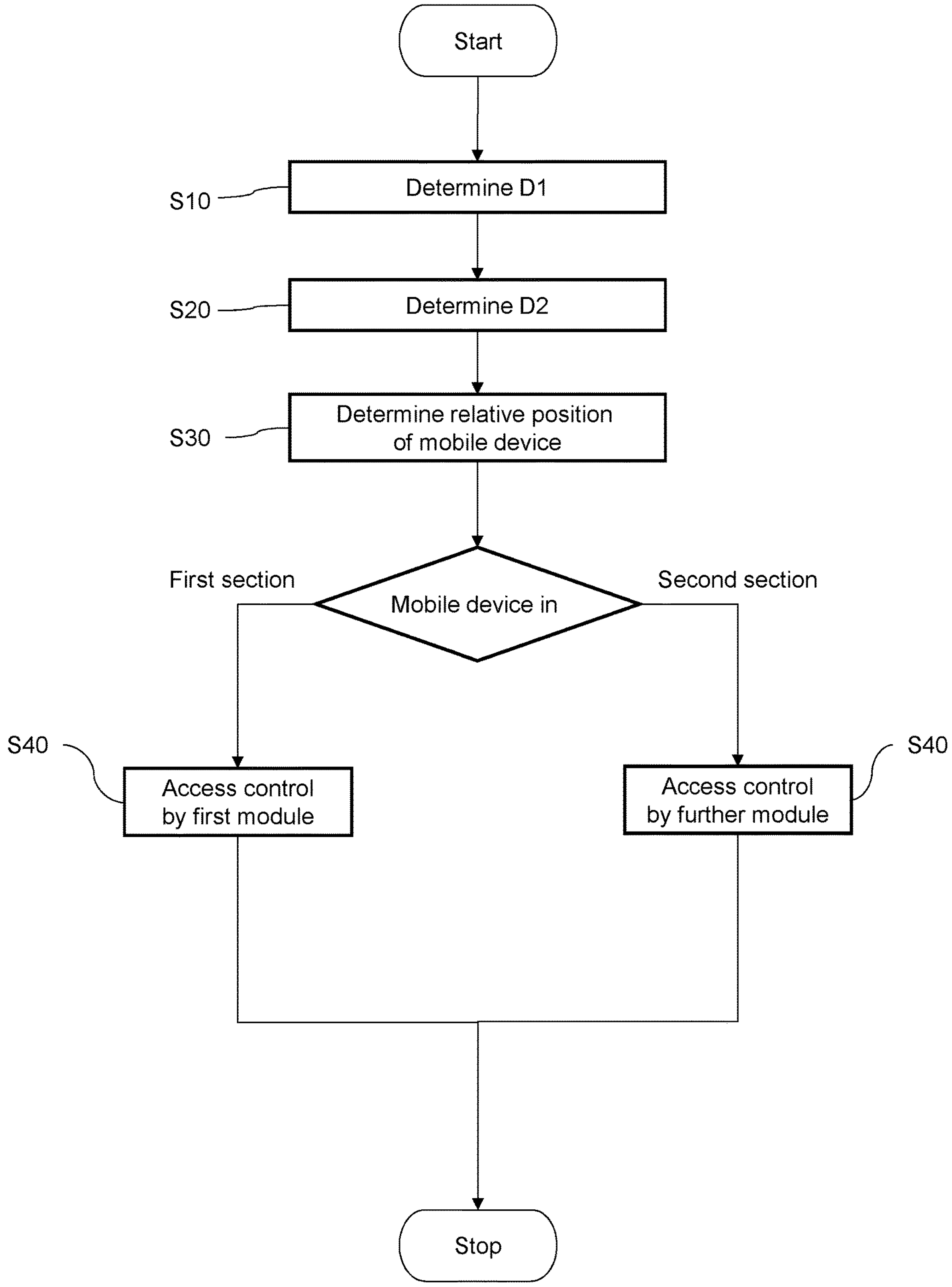
FIG. 7: shows a flow chart illustrating a sequence of steps for determining the relative position of the mobile device within the secure control area as well as performing access control related to the mobile device according to a first embodiment of the present invention.

Turning now to FIGS. 5 to 7, embodiments of the herein disclosed computer implemented method for operating a security control module 10 and a security control system 1 in a secure control area A shall be described with reference to illustrative flowcharts.

FIG. 5 shows a simplified flow chart illustrating a sequence of steps for determining the relative position of the mobile device, according to a first embodiment.

In a step S10, a first distance D1 between the security control module 10 and a mobile device 100 is determined by the security control module 10. In a first substep S12 of step S10, the ultra-wideband transceiver 12 of the security control module 10 and an ultra-wideband communication module 102 of the mobile device 100 jointly establish a first ultra-wideband transmission. Thereafter, in a second substep S14 of step S10, signal properties of the first ultra-wideband transmission between the security control module 10 and the ultra-wideband communication module 102 of the mobile device 100 are processed by the processing unit 14 to thereby determine the first distance D1 between the security control module 10 and a mobile device 100.

In a step S20, a second distance D2 between the ultra-wideband transceiver 22 of the further security control module 20 and the mobile device 100 is determined by the ultra-wideband transceiver 22 of the further security control module 20. In a first substep S22 of step S20, the further security control module 20 and an ultra-wideband communication module 102 of the mobile device 100 jointly establish a second ultra-wideband transmission. Thereafter, in a second substep S24 of step S20, signal properties of the second ultra-wideband transmission between the further security control module 20 and the ultra-wideband communication module 102 of the mobile device 100 are processed to thereby determine the second distance D2 between the ultra-wideband transceiver 22 and the mobile device 100.

It shall be noted that, according to particular embodiments disclosed herein, the steps S10 and S20 are analogous or even identical steps performed by different security control modules 10, 20 of a plurality of security control modules 10, 20 of a security control system 1.

According to embodiments disclosed herein, the security control module 10 and/or the further security control module 20 are configured to determine the first distance D1 respectively the second distance D2 by processing signal properties of the ultra-wideband transmissions including one or more of: a propagation time; an amplitude variation; and/or a phase difference.

Determining the first distance D1 respectively second distance D2 based on the propagation time of the ultra-wideband transmissions comprising measuring the time required for a signal to travel from the ultra-wideband transceiver 12, 22 to the ultra-wideband communication module 102 of the mobile device 100; and/or the time required for a signal to travel from the ultra-wideband communication module 102 of the mobile device 100 to the ultra-wideband transceiver. In a particular embodiment, a time difference is used as a basis for determining the first distance D1 respectively second distance D2, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband transceiver 12, 22 sending the request value and the mobile device 100 receiving the request value, or a "round-trip time-of-flight" time difference, in which a second transmission takes place from 102 of the mobile device 100 to the ultra-wideband transceiver 12, 22 either prior to, or after, the first transmission of the request value. In the "one-way time-of-flight" scenario, the ultra-wide-band transceiver 10, 12 and the ultra-wideband communication module 102 of the 100 need to be provided with tightly synchronized clocks for accurately determining the distance D1, D2. In the latter case of a "round-trip time-of-flight" calculation, there is stored, either in the mobile device 100 or the ultra-wideband transceiver 12, 22, an accurate representation of the processing time, i.e. the time it takes between the reception of an ultra-wideband transmission and the sending of a response ultra-wideband transmission, which processing time allows for accurately determining the distance D1, D2. Measurement of a time required for the signal to travel from the ultra-wideband transceiver 12, 22 to the ultra-wideband communication module 102 of the mobile device 100 and back "round-trip time-of-flight" is advantageous as it does not require the precise synchronization of clock signals of the ultra-wideband transceiver 12, 22 and the mobile device 100.

Determining the distance D1, D2 based on amplitude difference, comprises determining the difference in signal amplitude between the signal transmitted by the ultra-wideband transceiver 12, 22 and the signal received by the ultra-wideband communication module 102 of the mobile device 100 (or vice-versa). By taking into consideration the attenuation of the signal, the distance D1, D2 between the ultra-wideband transceiver 12, 22 and the mobile device 100 is calculated.

Determining a distance D1, D2 based on phase difference comprises detecting the difference in signal phase between the signal transmitted by the ultra-wideband transceiver 12, 22 and the signal received by the ultra-wideband communication module 102 of the mobile device 100. By taking into consideration the change in signal phase, the distance D1, D2 between the ultra-wideband transceiver 12, 22 and the ultra-wideband communication module 102 of the mobile device 100 is determined. It is to be understood that for the amplitude difference and phase difference, alternatively, the signal may also be transmitted by the ultra-wideband communication module 102 of the mobile device 100 and received by the ultra-wideband transceiver 12, 22.

In a subsequent step S30, the relative position of the mobile device 100 with respect to the security control module 10, 20 is determined by the processing unit(s) 14, 24, as described above in detail with reference to FIGS. 2B and 3B. In a first substep S32, the security control module 10 and further security control module 20 exchange data indicative of the first distance D1 and second distance D2, while in a subsequent substep S34 of step S30, at least one of the security control modules 10, 20 determines the relative position of the mobile device 100 with respect to the security control module 10, 20.

According to embodiments disclosed herein, the relative position of the mobile device 100 with respect to the security control module 10 comprises (but is not limited to) an indication whether the mobile device 100 is within a defined proximity range of the security control module 10.

According to further embodiments, within step S30, the processing units 14, 24 determine the relative position of the mobile device 100 further with respect to the first section I and the second section O of the plurality of sections I, O of the secure control area A.

According to further embodiments, within step S30, location data indicative of the absolute position of the security control module 10, respectively the further security control module 20 with respect to said first section I and second section O is made available to the processing unit(s) 14, 24. According to embodiments disclosed herein, the data is retrieved by the processing unit(s) 14, 24 from a storage unit, such as an internal memory and/or a database. Alternatively, or additionally, the data is transmitted to the processing unit(s) 14, 24 from an external storage, such as an external database, a remote server or from the security control module 10 or further security control module 20. According to a particular embodiment of the present invention, said location data indicative of the absolute position of the of the security control module 10 comprises a first transceiver distance a1 indicative of a distance of the security control module 10 from said border B and a second transceiver distance a2 indicative of a distance of the further security control module 20 from said border B.

FIG. 6A shows a flow chart illustrating a sequence of steps for establishing the UWB transmissions, according to a first embodiment of the present invention, referred to as gate initiated transmission. According to gate initiated transmission, the substeps S12 and/or S22 comprise transmitting a request message to the ultra-wideband communication module 102 of the mobile device 100 by the security control module 10 and further security control module 20 and processing the response messages received from the mobile device 100. Gate initiated transmission is advantageous as the timing respectively the frequency of the interrogation (transmitting a request message to the mobile device) is solely in the control of the security control module 10, 20.

FIG. 6B shows a flow chart illustrating a sequence of steps for establishing the UWB transmissions, according to a further embodiment of the present invention, referred to as mobile device initiated transmission. According to mobile device initiated transmission, the substeps S12 and/or S22 comprise the mobile device 100 broadcasting a UWB signal (by its ultra-wideband communication module 102), the security control module 10 and further security control module 20 receiving said broadcast UWB signals. Mobile device 100 initiated transmission is advantageous since it allows the mobile device 100 to control the timing/frequency of the broadcast signal(s), allowing the mobile device 100 to switch its respective radio communication module 102 into a standby/low-power or off mode to thereby conserve energy.

As illustrated in FIG. 7, according to further embodiments disclosed herein, the computer implemented method for operating a security control system 1 further comprises executing an access control process for the mobile device 100 by the security control module 10 and/or the further security control module 20 of the plurality of security control modules 10, 20 if the mobile device 100 has been determined to be positioned in said first section I or said second section O of the secure control area A, respectively. In other words, the security control module 10, 20 nearest to the mobile device 100 is the one which handles access control for the mobile device 100.

Alternatively, or additionally, step S40 comprises surveillance actions comprising, logging said relative position of the mobile device 100 onto an internal data storage, transmitting said relative position of the mobile device 100 to an external data storage, raising an alarm if certain conditions are met with respect to the relative position and/or the mobile device 100 itself.

Figure 8:
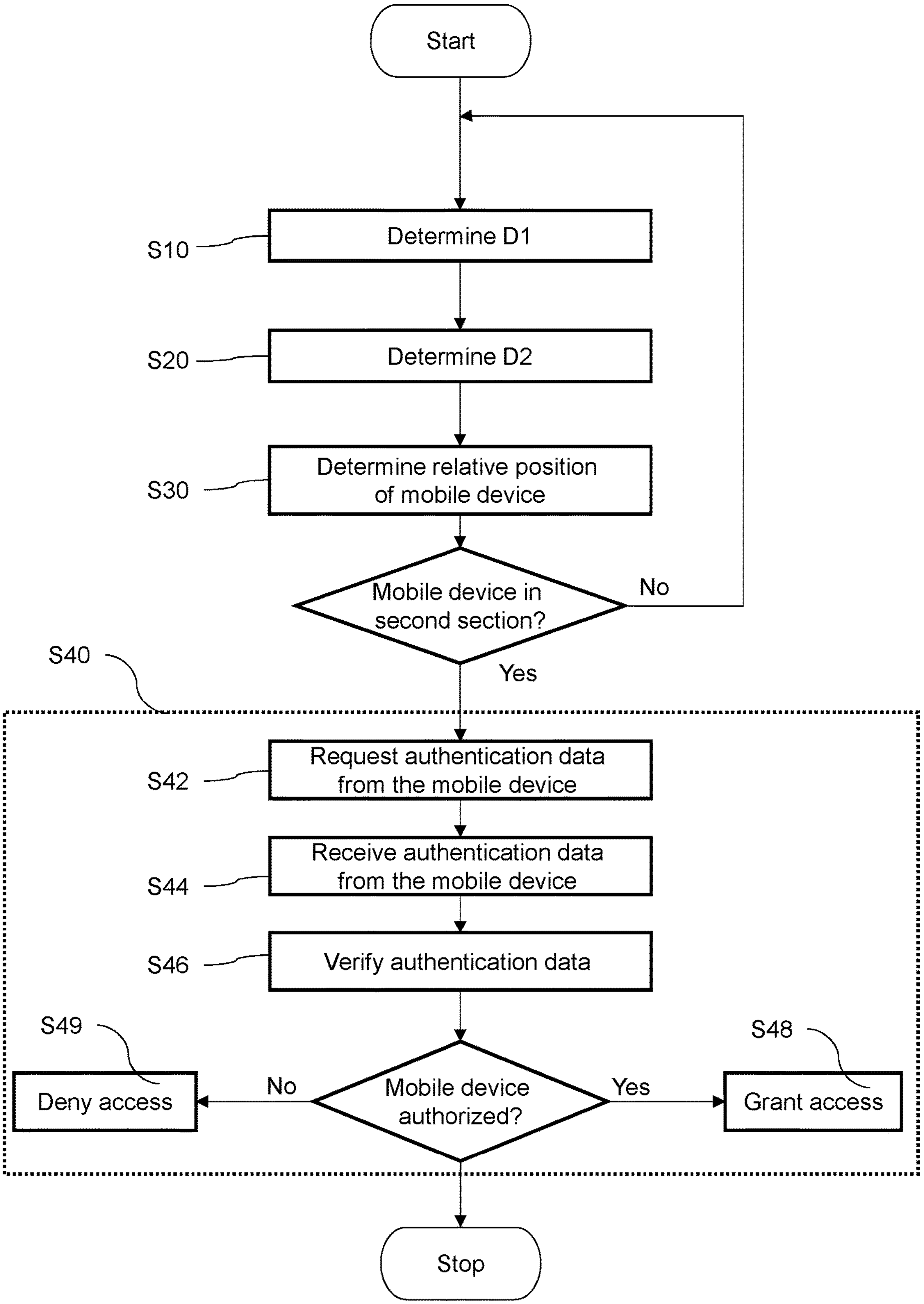
FIG. 8: shows a flow chart illustrating a sequence of access control steps according to a first embodiment of the present invention.

As illustrated in FIG. 8, according to embodiments disclosed herein, executing access control for the mobile device 100 comprises:

- Substep S42: requesting authentication data from the mobile device 100;
- Substep S44: receiving authentication data from the mobile device 100;
- Substep S46: verifying said authentication data from mobile device 100 against a set of authorized users/mobile devices and/or validating a digital signature in order to determine whether the mobile device 100 (respectively its holder) is authorized;
- Substep S48: granting access for a holder of the mobile device 100 if the mobile device 100 is authorized, particularly comprising one or more of: opening a section separation panel(s) 5, unlocking a door and/or allowing passage of a turnstile; and
- Substep S49: denying access for the holder of the mobile device 100 if the mobile device 100 not authorized, particularly comprising one or more of: closing/locking a section separation panel(s) 5, locking a door and/or denying passage of a turnstile.

Figure 9:
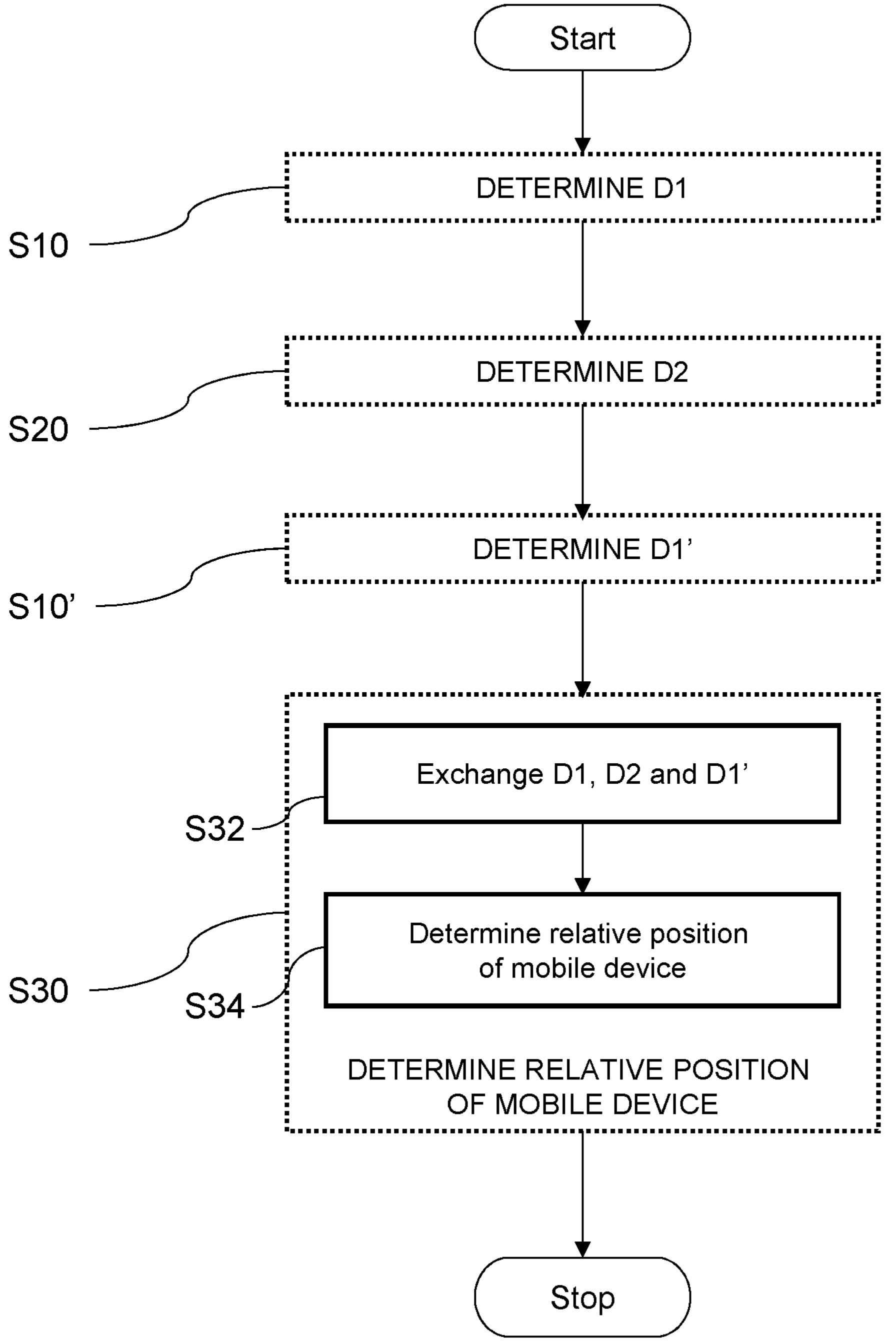
FIG. 9: shows a flow chart illustrating a sequence of steps for determining the relative position of the mobile device within the secure control area with respect to a plurality of passageways according to embodiments of the present invention.

Turning now to FIG. 9, a sequence of steps of a computer implemented method for operating a security control system 1 for determining the relative position of the mobile device 100 within the secure control area A with respect to a plurality of passageways 4, 4' shall be described. In a step S10, a first distance D1 between the security control module 10 and a mobile device 100 is determined by the security control module 10. In a step S20, a second distance D2 between the further security control module 20 and the mobile device 100 is determined by further security control module 20. In a step S10', a first adjacent distance D1' between an adjacent security control module 10' of an adjacent passageway 4' and the mobile device 100 is determined by the adjacent security control module 10'.

In a subsequent step S30, at least one of the processing units 14, 14' and 24 of the plurality of security control modules 10, 20, 10' determines the relative position of the mobile device 100 with respect to each of the plurality of passageways 4, 4'. In a first substep S32 of step S30, the security control modules 10, 20 and 10' exchange the distances D1, D2, D1' between themselves (each security control module transmits the distance D1 itself determined and receives the distances D1', D2 determined by the "other" security control modules).

Having exchanged distance data D1, D1' and D2, at least one of the processing units 14, 14' and 24 of the plurality of security control modules 10, 20, 10' determines the relative position of the mobile device 100 based on the first distance D1 determined by itself and the distances D2, D1' received from the other of security control modules 10, 20, 10'.

According to further embodiments, within step 30, location data indicative of the absolute position of the security control module 10, the security control module 10', and the further security control module 20 with respect to said first section I, the second section O and with respect to the passageway 4 and the adjacent passageway 4' is made available to the processing unit(s) 14, 24, 14'. According to embodiments disclosed herein, the data is retrieved by the processing unit(s) 14, 24, 14' from a storage unit, such as an internal memory and/or a database. Alternatively, or additionally, the data is transmitted to the processing unit(s) 14, 24, 14' from an external storage, such as an external database, a remote server. According to a particular embodiment of the present invention, said location data indicative of the absolute position of the of the security control module 10 comprises a first transceiver distance a1 indicative of a distance of the security control module 10 from said border B, a first adjacent transceiver distance a1' indicative of a distance of the adjacent security control module 10' from said border B and a second transceiver distance a2 indicative of a distance of the further security control module 20 from said border B.

It should be noted that, in the description, the computer program code has been associated with specific processors and the sequence of the steps has been presented in a specific order, one skilled in the art will understand, however, that the computer program code may be structured differently and that the order of at least some of the steps could be altered, without deviating from the scope of the invention. For example, one skilled in the art will understand that at least some of the functions and operations described above can be implemented and performed on the computer system.

Further disclosed and proposed are:

- A data processing apparatus/device/network/system comprising means for carrying out one or more method steps according to embodiments of a method disclosed herein.

A data processing apparatus/device/network/system comprising a processor for carrying out one or more method steps according to embodiments of a method disclosed herein.

A computer program product comprising computer-executable instructions which, when executed by a data processing apparatus/device/network/system, cause the data processing apparatus/device/network/system to carry out one or more method steps according to embodiments of a method disclosed herein.

Computer-readable media, comprising volatile and/or non-volatile storage media (such as a data carrier) and/or transmission media (such as a data carrier signal), comprising computer-executable instructions which, when executed by a data processing apparatus/device/network/system, cause the data processing apparatus/device/network/system to carry out one or more method steps according to embodiments of a method disclosed herein.

A computer readable data structure comprising computer-executable instructions which, when executed by a data processing apparatus/device/network/system, cause the data processing apparatus/device/network/system to carry out one or more method steps according to embodiments of a method disclosed herein.

LIST OF REFERENCE NUMERALS security control system 1
first sidewall 2
second sidewall 3
passageway 4, 4'
section separation panel (s) 5
security control module 10, 20, 10'
ultra-wideband transceiver 12, 22, 12'
processing unit 14, 14', 24
mobile device 100
ultra-wideband communication module (of the mobile device) 102
first distance D1, D1'
second distance D2
transceiver distance a1, a2, a1'
secure control area A
first section (of secure control area) I
second section (of secure control area) O
border (between sections of the secure control area) B

What is claimed is:

1. A security control module for controlling access through a passageway of a secure control area, the security control module comprising:

an ultra-wideband transceiver configured to establish an ultra-wideband transmission with an ultra-wideband communication module of a mobile device; and a processing unit configured to determine a first distance between the security control module and the mobile device by processing signal properties of the ultra-wideband transmission, the security control module being configured to receive a second distance from a further security control module arranged at a spacing distance apart from the security control module, the second distance being indicative of a distance between the further security control module and the mobile device, the security control module being further configured to transmit the first distance to the further security control module, and the processing unit being configured to determine the relative position of the mobile device with respect to the security control module based on the first distance and the second distance.

2. The security control module according to claim 1, wherein the security control module is configured to transmit the first distance to the further security control module and to receive the second distance from the further security control module via an ultra-wideband transmission between the ultra-wideband transceiver and an ultra-wideband transceiver of the further security control module.

3. The security control module according to claim 1, wherein the security control module is further configured to deny, disregard and/or block authentication requests from the mobile device if the mobile device has been determined to be positioned at distance greater than a threshold distance from the security control module and/or if the first distance has been determined to be greater than the second distance received from the further security control module.

4. The security control module according to claim 1, wherein the ultra-wideband transceiver is configured to determine the first distance by processing signal properties of the ultra-wideband transmission including one or more of: a propagation time; an amplitude variation; and/or a phase difference.

5. A security control system for controlling access through a passageway of a secure control area comprising a plurality of security control modules according to claim 1, wherein a security control module and a further security control module of the plurality of security control modules is located in a first section and a second section of the secure control area, respectively, the passageway connecting said first section and said second section, the processing units of the security control module and/or the further security control module being configured to determine the relative position of the mobile device further with respect to the first section and said second section of the secure control area.

6. The security control system according to claim 5, wherein the spacing distance between any pair of the plurality of security control modules is greater than or equal to the sum of the measurement precision of the ultra-wideband transceivers of said pair of security control modules.

7. The security control system according to claim 5, wherein the ultra-wideband transceivers of the security control module and the further security control module of the plurality of security control modules are aligned essentially orthogonal to a border delimiting the first section from the second section of the secure control area, wherein the processing units of the security control module and/or the further security control module are configured to determine the relative position of the mobile device further based on location data comprising a transceiver distance indicative of a distance of the ultra-wideband transceivers from said border.

8. The security control system according to claim 5, wherein the security control module and/or the further security control module of the plurality of security control modules are further configured to execute an access control process for the mobile device if the mobile device has been determined to be positioned in said first section or said second section of the secure control area, respectively.

9. The security control system according to claim 5, wherein:

a third security control module of the plurality of security control modules is arranged in the proximity of a further passageway connecting said first section and said second section adjacent to the passageway;

at least one of the processing units of the plurality of security control modules is configured to determine the relative position of the mobile device further with respect to each of the plurality of passageways, based on the first distance determined by the corresponding security control module and a plurality of distances received from the plurality of security control modules.

10. A computer implemented method for operating a security control system according to claim 5 in a secure control area, the method comprising:

establishing an ultra-wideband transmission between each ultra-wideband transceiver of the plurality of security control modules and an ultra-wideband communication module of a mobile device;

determining—by the processing units of each security control module—a first distance between the security control modules and the mobile device by processing signal properties of the ultra-wideband transmissions;

at least one security control module transmitting the first distance to the further security control modules;

at least one security control module receiving a second distance from a further security control module arranged at a spacing distance apart, the second distance being indicative of distances between the further security control modules and the mobile device; and determining—by at least one processing unit of the security control module—the relative position of the mobile device with respect to the security control modules.

11. The method of claim 10, further comprising the step of executing an access control process for the mobile device by the security control module and/or the further security control module of the plurality of security control modules if the mobile device has been determined to be positioned in said first section or said second section of the secure control area, respectively.

12. The method of claim 11, wherein executing access control for the mobile device comprises:

requesting authentication data from the mobile device;

receiving authentication data from the mobile device;

verifying said authentication data from the mobile device in order to determine whether the mobile device is authorized; and granting access for the mobile device if the mobile device is authorized, particularly comprising one or more of: opening a section separation panel; unlocking a door and/or allowing passage of a turnstile operatively connected to the security control system.

13. A computer program product comprising computer-executable instructions which, when executed by a processing unit of a plurality of security control modules of a security control system, causes the security control system to carry out the method according to claim 10.

14. A computer implemented method for operating a security control module according to claim 1 in a secure control area, the method comprising:

establishing an ultra-wideband transmission between an ultra-wideband transceiver of the security control module and an ultra-wideband communication module of a mobile device;

determining—by a processing unit of the security control module—a first distance between the security control module and the mobile device by processing signal properties of the ultra-wideband transmission;

receiving a second distance from a further security control module arranged at a spacing distance apart from the security control module, the second distance being indicative of a distance between the further security control module and the mobile device;

transmitting the first distance from the security control module to the further security control module; and determining—by the processing unit of the security control module—the relative position of the mobile device with respect to the security control module based on the first distance and the second distance.

15. The method of claim 14, further comprising the step of denying, disregarding and/or blocking authentication requests from the mobile device if the mobile device has been determined to be positioned at a distance greater than a threshold distance from the security control module.

16. The method of claim 14, wherein determining the first distance between the ultra-wideband transceiver and the mobile device comprises:

transmitting a request message to the ultra-wideband communication module of the mobile device and processing a response message received from the mobile device; and/or receiving and processing a broadcast UWB signal from the mobile device.

17. A computer program product comprising computer-executable instructions which, when executed by a processing unit of a security control module, causes the security control module to carry out the method according to claim 14.

* * * * *